United States Patent
Rosa Dortschy et al.

(10) Patent No.: US 10,819,423 B2
(45) Date of Patent: Oct. 27, 2020

(54) NETWORK NODE, AN OPTICAL TRANSCEIVING UNIT AND METHODS THEREIN FOR DETERMINING INFORMATION ASSOCIATED WITH AN OPTICAL FIBER

(71) Applicant: Telefonaktiebolaget LM Ericsson (publ), Stockholm (SE)

(72) Inventors: Adriana Rosa Dortschy, Hägersten (SE); Boris Dortschy, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/609,741

(22) PCT Filed: Jun. 2, 2017

(86) PCT No.: PCT/SE2017/050589
§ 371 (c)(1),
(2) Date: Oct. 31, 2019

(87) PCT Pub. No.: WO2018/222097
PCT Pub. Date: Dec. 6, 2018

(65) Prior Publication Data
US 2020/0083953 A1    Mar. 12, 2020

(51) Int. Cl.
*H04B 10/071* (2013.01)
*H04B 10/079* (2013.01)
(Continued)

(52) U.S. Cl.
CPC ......... *H04B 10/071* (2013.01); *H04B 10/073* (2013.01); *H04B 10/0775* (2013.01); *H04B 10/07953* (2013.01); *H04B 10/40* (2013.01)

(58) Field of Classification Search
CPC .... H04B 10/071; H04B 10/073; H04B 10/40; H04B 10/07953
See application file for complete search history.

(56) References Cited

U.S. PATENT DOCUMENTS 7,493,040 B1 *  2/2009  Schofield ............. H04B 10/071
                                                           398/33
2002/0051129 A1  5/2002  Chae et al.
(Continued)

FOREIGN PATENT DOCUMENTS

| JP | 2014159987 A | 9/2014 |
| WO | 2015160293 A1 | 10/2015 |
| WO | 2016008662 A1 | 1/2016 |

OTHER PUBLICATIONS

International Search Report and Written Opinion for International Application No. PCT/SE2017/050589, dated Feb. 20, 2018, 11 pages.
(Continued)

*Primary Examiner* — Leslie C Pascal
(74) *Attorney, Agent, or Firm* — NDWE LLP (57) ABSTRACT

A method in a network node for determining information associated with an optical fiber in a communications network. The optical fiber is connected to an optical transceiver unit. The network node configures the optical transceiver unit to transmit at least one first optical signal via the optical fiber, wherein the at least one first optical signal is an optical pulse train defined by a determined period. The network node then obtains information associated with at least one second optical signal received by the optical transceiver unit via the optical fiber in response to the transmitted at least one first optical signal. Thus, the network node may determine information associated with the optical fiber based on the obtained information. Also, an optical transceiver unit for enabling a determination of information associated with an optical fiber in a communications network and methods therein.

20 Claims, 6 Drawing Sheets

(51) Int. Cl.
     *H04B 10/40*      (2013.01)
     *H04B 10/073*     (2013.01)
     *H04B 10/077*     (2013.01)

(56) References Cited

U.S. PATENT DOCUMENTS

| | | | |
|---|---|---|---|
| 2004/0070750 A1* | 4/2004 | Iannelli | G01M 11/3145 356/73.1 |
| 2012/0278043 A1* | 11/2012 | Lewis | G01D 5/35387 702/189 |
| 2017/0134088 A1* | 5/2017 | Park | H04B 10/0795 |
| 2017/0205255 A1* | 7/2017 | Nannipieri | G01D 5/35364 |

OTHER PUBLICATIONS

International Preliminary Report on Patentability for International Application No. PCT/SE2017/050589, dated Jun. 17, 2019, 21 pages.

"SFP+ 10 Gb/s and Low Speed Electrical Interface," Sep. 15, 2013, 136 pages, SFF-8431 Rev 4.1 + Addendum, SFF Committee.

"Diagnostic Monitoring Interface for Optical Transceivers," Sep. 14, 2010, 39 pages, SFF-8472 Rev 11.0, SFF Committee.

"iSFC® Micro-OTDR Transceiver Series Fast Fiber Fault Finder™, SFP with integrated Micro-OTDR (uOTDR™)—iSFC® Automatically Detects, Locates and Reports Optical Fiber Faults," 2015, 4 pages, Optical Zonu Corporation.

"TI Optical Module 10G SFP+ Total Solution," Jan. 2013, 26 pages, Application Report SLLA335, Texas Instruments Inc.

Communication pursuant to Article 94(3) EPC for EP Application No. 17730584.4, dated Jul. 3, 2020, 4 pages.

\* cited by examiner

NETWORK NODE, AN OPTICAL TRANSCEIVING UNIT AND METHODS THEREIN FOR DETERMINING INFORMATION ASSOCIATED WITH AN OPTICAL FIBER

CROSS-REFERENCE TO RELATED APPLICATIONS

This application is a National stage of International Application No. PCT/SE2017/050589, filed Jun. 2, 2017, which is hereby incorporated by reference.

TECHNICAL FIELD

Embodiments herein relate to optical fibers for use in communications network. In particular, embodiments herein relate to a network node and method therein for determining information associated with an optical fiber in a communications network. Also, embodiments herein relate to an optical transceiver unit and method therein for enabling a determination of information associated with an optical fiber in a communications network.

BACKGROUND

It is of common interest to operators of fiber optical communication infrastructures which may comprise a network of optical fibers to receive information about the infrastructure's condition, i.e. information about the conditions of the optical fibers in the network. One such condition that may be of interest may be, for example, be a broken or damaged optical fiber or a not properly connected end connector of an optical fiber.

Figure 1:
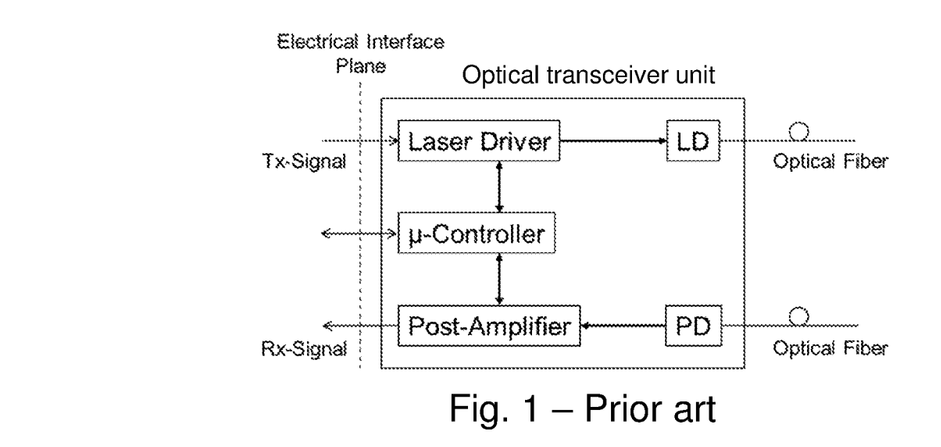
FIG. 1 is a schematic block diagram illustrating conventional optical transceiver unit.

Optical transmission in a fiber optical network is commonly performed by optical transceiver units or modules capable of converting electronic signals into optical signals and transmitting the optical signals via an optical fiber, and vice versa. One example of such optical transceiver units is so-called Small Form factor Pluggable, SFP, optical transceivers which may be placed on a printed circuit board of a switch, or other communications network entity and be arranged to receive an end connector of an optical fiber cable. An example of a conventional optical transceiver unit is shown in FIG. 1.

Some specifications for such optical transceiver units specify diagnostic interfaces and parameters for use in determining the condition of a connected optical fiber or the optical link status, such as, for example, a receiving Loss-of-Signal parameter, Rx_LOS, in SFF Committee, SFF-8431, Specification for SFP+ 10 Gb/s and Low Speed Electrical Interface, Rev 4.1, Section 2.4, or a measured receiving input power parameter, Measured RX Input Power, in SFF Committee, SFF-8472, Specification for Diagnostic Monitoring Interface for Optical Transceivers, Rev 11.0. While these parameters may give an indication if there is a problem on physical layer level, they only allow for a rather simple analysis of the connection status of the optical fiber, e.g. on/off, and only provides local information, e.g. the optical transceiver unit is no longer receiving an optical signal. Thus, these types of real-time diagnostic features for optical transceiver units may only provide rudimentary information about the condition of the optical fiber or the corresponding optical link, such as, e.g. a sudden loss-of-signal indicating failing connectivity, but may barely, if at all, provide any location related information about the cause of the failure of the optical fiber.

Another typical and more powerful approach is based on using Optical Time Domain Reflectometry, OTDR. OTDR is the optical equivalent of an electronic time domain reflectometer. Individual optical pulses are transmitted on one end into the fiber during test phase. At the same end of the optical fiber, the intensity of backscattered light, such as, e.g. Rayleigh backscattering, or light that is reflected back from locations along the optical fiber, such as, e.g. Fresnel back-reflection due to airgaps, is then measured together with the relative timing to the transmitted individual pulse. In the OTDR analysis, changes of the intensity over time may then be processed to provide a spatial resolution of attenuation and reflection events. However, in order to get a high spatial resolution using OTDR, the OTDR processing requires high speed analogue-to-digital conversion with good precision. This is the reason why high performance OTDR devices normally exist as handheld or benchtop devices. Today, implementing high performance OTDR measurements usually also requires error detection handling, or incident event handling, in order to first determine that something is wrong with the optical fiber. Then, an operator or technician may be notified and dispatched to the source of the detected error in order to perform a test on the optical fiber using equipment capable of performing the high performance OTDR measurements on the optical fiber. Hence, there is little or no automation when performing high performance OTDR measurements.

Although there are optical transceiver units available with in-built OTDR measurement capabilities, also commonly referred to as Micro-OTDR, the complexity, cost and low achievable accuracy of implementing SFP optical transceivers with in-built OTDR measurement capability usually makes this not a particularly feasible solution. Additionally, while no involvement of an operator or technician might be necessary in this case, errors or events occurring within short distances from the optical transceiver unit may be difficult to identify due to the lack of a launch lead fiber section. Ideally, an ODTR device connects to the optical fiber with a launch lead, which is a standard patch cord with suitable connectors on both ends. This ensures that the first event in the optical fiber may be properly quantified. If a launch lead is not used, the high reflection from the OTDR's internal connector may masks the actual reflectance and attenuation of the optical fiber.

This may be acceptable in an optical fiber access network comprised mainly of very long optical fiber cables (e.g. several kilometres of cable), but not in, for example, data centers comprising large amounts of interconnecting short optical fiber cables.

SUMMARY

It is an object of embodiments herein to improve determination of information associated with an optical fiber in a communications network.

According to a first aspect of embodiments herein, the object is achieved by a method in a network node for determining information associated with an optical fiber in a communications network, said optical fiber being connected to an optical transceiver unit. The network node configures the optical transceiver unit to transmit at least one first optical signal via the optical fiber, wherein the at least one first optical signal is an optical pulse train defined by a determined period. Also, the network node obtains information associated with at least one second optical signal received by the optical transceiver unit via the optical fiber in response to the transmitted at least one first optical signal.

Further, the network node determines information associated with the optical fiber based on the obtained information.

According to a second aspect of embodiments herein, the object is achieved by a network node for determining information associated with an optical fiber in a communications network, said optical fiber being connected to an optical transceiver unit. The network node is configured to configure the optical transceiver unit to transmit at least one first optical signal via the optical fiber, wherein the at least one first optical signal is an optical pulse train defined by a determined period. Also, the network node is configured to obtain information associated with at least one second optical signal received by the optical transceiver unit via the optical fiber in response to the transmitted at least one first optical signal. Further, the network node is configured to determine information associated with the optical fiber based on the obtained information.

According to a third aspect of embodiments herein, the object is achieved by a method performed by an optical transceiver unit for enabling a determination of information associated with an optical fiber in a communications network, said optical transceiver unit being configured to be connected to the optical fiber. The optical transceiver unit transmits at least one first optical signal via the optical fiber, wherein the at least one first optical signal is an optical pulse train defined by a determined period. Also, the optical transceiver unit receives at least one second optical signal received via the optical fiber in response to the transmitted at least one first optical signal.

According to a fourth aspect of embodiments herein, the object is achieved by an optical transceiver unit for enabling a determination of information associated with an optical fiber in a communications network, said optical transceiver unit being configured to be connected to the optical fiber. The optical transceiver unit is further configured to transmit at least one first optical signal via the optical fiber, wherein the at least one first optical signal is an optical pulse train defined by a determined period. Also, the optical transceiver unit is further configured to receive at least one second optical signal via the optical fiber in response to the transmitted at least one first optical signal.

According to a fifth aspect of embodiments herein, the object is achieved by a computer program, comprising instructions which, when executed on at least one processor, cause the at least one processor to carry out the methods described above. According to a sixth aspect of embodiments herein, the object is achieved by a carrier containing the computer program described above, wherein the carrier is one of an electronic signal, optical signal, radio signal, or computer readable storage medium.

By having an optical pulse train defined by a determined period transmitted via the optical fiber, an optical reference signal having signal properties that may be interpreted as periodic or sinusoidal is inserted into the optical fiber and may then be compared to its reflected counter-part, i.e. the reflected part of the optical pulse train generated by the optical fiber in response to the transmitted optical reference signal. The power, or related qualities, and phase delay values obtainable through the perceived periodic or sinusoidal properties of the optical reference signal and its reflected counter-part provide input to and enables an impulse response analysis of the optical fiber. Hence, a low cost and low complexity determination of information associated with an optical fiber in a communications network with a high level of accuracy is provided. Hence, determination of information associated with an optical fiber in a communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

The figures are schematic and simplified for clarity, and they merely show details which are essential to the understanding of the embodiments presented herein, while other details have been left out. Throughout, the same reference numerals are used for identical or corresponding parts or steps.

Figure 2:
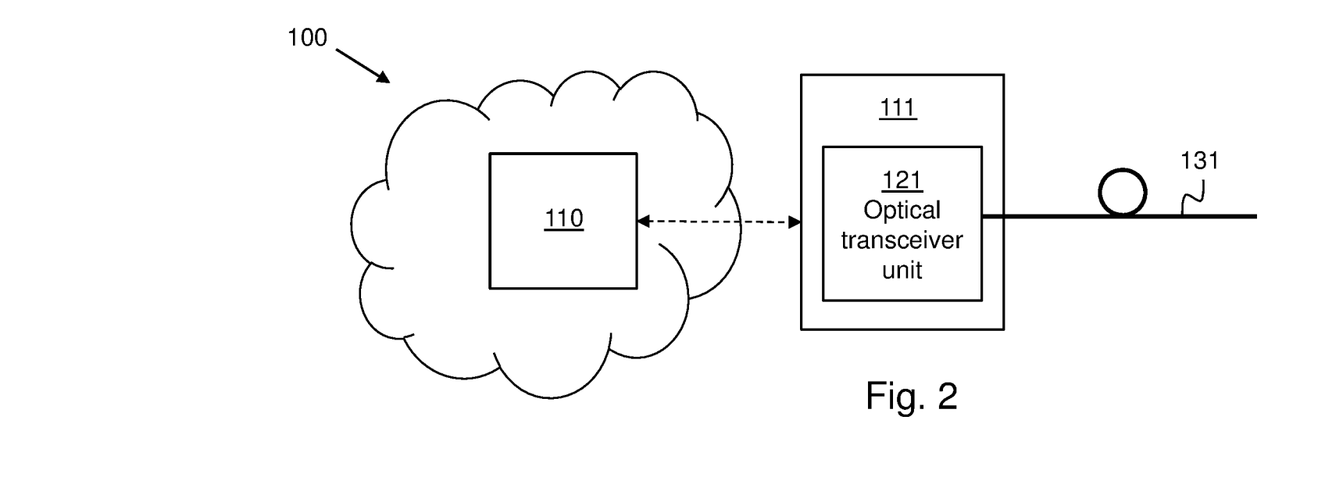
FIG. 2 is a schematic block diagram illustrating embodiments of network nodes and an optical transceiver unit in a communications network.

FIG. 2 shows an example of a data communications network 100. The data communications network 100 comprises a first network node 110 and a second network node 111. The first and second network nodes 110, 111 may be any type of network node or entity, such as, e.g. a server or computer, that is capable of processing data and communicating within a data communications network, such as, e.g. a private network (LAN, WAN, etc.), telecommunications network, at least partly cloud-based network, or over the internet. The first and second network nodes 110, 111 may be arrange to communicate with each other via the data communications network 100.

In FIG. 2, the first network node 110 may be located anywhere within the data communications network 100, e.g. it may be a part of a network or cloud-based infrastructure accessible over the internet. The second network node 111 is connected to an optical fiber 131 via an optical transceiver unit 121. The optical transceiver unit 121 is connected to an end-point of the optical fiber 131. The optical transceiver unit 121 may, for example, be a Small Form factor Pluggable, SFP, optical transceiver or similar small-scale optical transceiver. The optical transceiver unit 121 is configured to convert electrical input signals into optical output signals, which are transmitted via the optical fiber 131. This is performed by generating and modulating short optical pulses, which are inserted into the optical fiber 131 via, for example, a laser diode.

It should be noted that FIG. 2 only shows one example of the embodiments presented herein and that the functionality of the first network node 111 also may be partly or completely implemented in the second network node 110. In other words, the first and second network nodes 110, 111 may also be co-located and/or be comprised in a single network node or entity. Therefore, reference in the following will only be made to a network node 110, 111.

As part of the developing of the embodiments described herein, it has been realized that it is possible to re-use the optical transmitter of the optical transceiver unit 121 in order to generate optical pulse trains defined by determined periods which may be transmitted into the optical fiber 131 in order to obtain information associated with the optical fiber 131. This is enabled by realizing that the fundamental frequency content of the generated optical signal pulse trains may be seen as and interpreted as a signal having periodic or sinusoidal signal properties. Hence, by using different periods for the optical pulse trains and measuring the sinusoidal signal properties of the optical fiber response to these periodic optical pulse trains, such as, e.g. received optical power and relative phase delay, it is possible to quantify the response of the optical fiber at different frequencies. For example, by combining the results from the different periods, a time-domain impulse response may be derived upon which an analysis of the reflection properties, errors or events, etc., of the optical fiber may be based. It has, for example, been noted that testing for only a few different periods of the optical pulse train allow for an highly accurate optical fiber length measurement. This is exemplified in more detail in the embodiments described below.

Furthermore, since the main functionality of the optical transceiver unit 121, such as, e.g. the optical transceiver units 121, is to convert provided electrical signal pulses in optical signal pulses and vice versa, the effective decision on how and when to generate and transmit the optical pulse trains in the optical transceiver unit 121 may preferably be performed external to the actual optical transceiver unit 121. This means that a control and measurement entity, such as, e.g. the network node 110 in FIG. 2, may be made responsible for this effective decision and may be implemented separately from the optical transceiver unit 121. This control and measurement entity may, for example, even be shared by multiple optical transceiver units. This also means that the complexity of the optical transceiver unit 121 may be reduced and that the overall cost of implementing an optical communications network comprising the optical transceiver unit 121 may be reduced. Embodiments of the network node 110, 111 and the optical transceiver unit 121 are explained and described in more detail below with reference to FIGS. 3-12.

Figure 3:
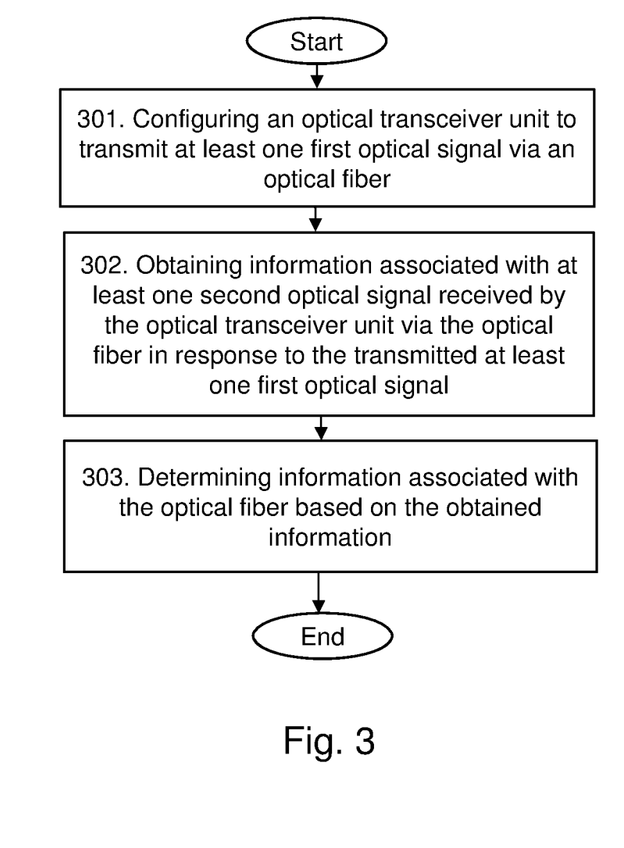
FIG. 3 is a flowchart depicting embodiments of a method in a network node.

Example of embodiments of a method performed by a network node 110, 111 for determining information associated with an optical fiber 131 in a communications network 100 will now be described with reference to the flowchart depicted in FIG. 3. Here, the optical fiber 131 is connected to an optical transceiver unit 121. FIG. 3 illustrates an example of actions or operations which may be taken by the network node 110, 111 as shown, for example, in FIG. 2. The method may comprise the following actions.

Action 301

First, the network node 110, 111 configures the optical transceiver unit 121 to transmit at least one first optical signal via the optical fiber 131, wherein the at least one first optical signal is an optical pulse train defined by a determined period. This means that the network node 110, 111 may, for example, send an electronic signal to the optical transceiver unit 121 that corresponds to the first optical signal. The optical transceiver unit 121 may then convert the electronic signal into an optical signal and transmit this first optical signal out onto the optical fiber 131. Optionally, when having a remotely located first network node, such as, e.g. the first network node 110 shown in FIG. 2, the first network node 110 may transmit information to the optical transceiver unit 121, or to a second network node 111 comprising the optical transceiver unit 121, which causes the optical transceiver unit 121 to transmit an optical signal corresponding to the first optical signal. This may, for example, include the network node 110, 111 sending instructions or information to the optical transceiver unit 121 indicating that it should transmit an optical signal corresponding to the first optical signal. Thus, in some embodiments, the network node 110, 111 may transmit a signal causing the optical transceiver unit 121 to transmit the at least one first optical signal.

Further, according to some embodiments, the network node 110, 111 may transmit control information causing the optical transceiver unit 121 to switch between a first operation of transmitting regular optical transmissions via the optical fiber 131 and a second operation of transmitting the at least one first optical signal via the optical fiber 131. This enables the network node 110, 111 to first put the optical transceiver unit 121 in a testing mode, which testing mode is different from the normal mode of operation when performing regular optical data communication via the optical fiber. In the testing mode, the optical transceiver unit 121 is configured to receive the electronic signal corresponding to the first optical signal or information indicating that the optical transceiver unit 121 is to transmit an optical signal that corresponds to the first optical signal. This is described in more detail below with reference to FIGS. 11-12.

Furthermore, by having the first optical signal be an optical pulse train defined by a determined period also provides the first optical signal with periodic or sinusoidal signal properties that are defined by the fundamental frequency given by the rectangular periodic optical signal pulse train. According to some embodiments the optical pulse train of the at least one first optical signal may comprise a series of individual optical pulse groups 600. Here, the length and timing of the individual optical pulse groups 600 in the series corresponds to the period 602 defining the optical pulse train of the at least one first optical signal. This is described in more detail below with reference to FIG. 6. Furthermore, the individual optical pulse groups 600 may also comprise a number of individual optical pulses 601. In some embodiments, the individual optical pulse groups 600 may further comprise one or more optical pulse gaps 701. This is described in more detail below with reference to FIG. 7.

In some embodiments, the least one first optical signal comprise two or more first optical signals. In this case, a period defining an optical pulse train of one of the two or more first optical signals may be different than a period defining an optical pulse train of another one of the two or more first optical signals. By using several different periods for the optical pulse trains of two or more first optical signals, it is possible quantify the response of the optical fiber 131 at different frequencies. In this case, according to some embodiments, the determined period defining an optical pulse train of a subsequently transmitted first optical signal may be shorter than the periods defining the optical pulse trains of any previously transmitted first optical signals. This means that the determined periods defining the transmitted optical pulse trains of the at least one first optical signals may start with a relatively long period and then be subsequently shortened for each subsequently transmitted first optical signals. Alternatively, according to some embodiments, the determined period defining an optical pulse train of a subsequently transmitted first optical signal may be longer than the periods defining the optical pulse trains of any previously transmitted first optical signals. This means that the determined periods defining the transmitted optical pulse trains of the first optical signals may start with a relatively short period and then be subsequently increased for each subsequently transmitted first optical signals. By gradually increasing or decreasing the periods defining the transmitted optical pulse trains of the first optical signals as described above, the number of transmissions of the first optical signals may be stopped whenever a suitable accuracy has been reached for the determined information, such as, a time-domain impulse response of the optical fiber 131 with sufficient resolution or a length of the optical fiber 131 with a sufficient accuracy. This is further described and exemplified in Action 303.

Action 302

After the configuration in Action 301, the network node 110, 111 obtains information associated with at least one second optical signal received by the optical transceiver unit 121 via the optical fiber 131 in response to the transmitted at least one first optical signal. In some embodiments, this means the reflected optical response signal generated in the optical fiber 131 in response to the transmitted at least one first optical signal, i.e. the at least one second optical signal, may be transmitted or forwarded to the network node 110, 111 by the optical transceiver unit 121, i.e. the obtained information associated with at least one second optical signal may be the at least one second optical signal itself. In this case, while amplification of the at least one second optical signal may be performed by the optical transceiver unit 121, no actual processing of the at least one second optical signal is normally performed by the optical transceiver unit 121. The processing of the at least one second optical signal is instead performed by the network node 110, 111. Optionally, information relating to the reflected optical response signal generated in the optical fiber 131 in response to the transmitted first optical signal may be transmitted to the network node 110, 111 by optical transceiver unit 121. In this case, the received optical power of the at least one second optical signal may, for example, be measured and transmitted by the optical transceiver unit 121 to the network node 110, 111. Both of these options enables the network node 110, 111 to perform an analysis of and evaluate the condition of the optical fiber 131 using the at least one first optical signal, the at least one second optical signal, and/or information relating thereto, such as, e.g. the transmission and reception timing of the at least first and at least second optical signals.

In some embodiments, the obtained information may comprise information indicating the phase-shift between the at least one first optical signal and the at least one second optical signal. This means that the network node 110, 111 may obtain the phase shift of the at least one second optical signal in comparison to its corresponding first optical signal, e.g. by deriving it from the transmission and reception of the at least one first and second optical signal. The phase shift may also be referred to as a relative time difference, phase delay or relative phase delay between the at least one first optical signal and the at least one second optical signal. In some embodiments, the obtained information may comprise information indicating the power of the at least one second optical signal and/or information indicating a Bit Error Rate, BER, value associated with the at least one second optical signal. This means that the network node 110, 111 may obtain the power of the at least one second optical signal either directly by measurements in the network node 110, 110 or directly from the optical transceiver unit. Optionally, the network node 110, 110 may obtain the power of the at least one second optical signal indirectly via a related parameter, such as, e.g. a Bit- or Symbol Error Rate, BER/SER, measurement of the at least one second optical signal in the network node 110, 111. In other words, the received power of the at least one second optical signal may be measured either directly or be indirectly derived from a BER measurement; the latter because BER/SER is strongly related to the received optical signal power in an optical transceiver unit 121. This is shown and described in reference to FIG. 5. The optical power information may, for example, be indicated by an optical power value or optical power indicator. Hence, the network node 110, 111 is enabled to perform an analysis of the condition of the optical fiber 131 using the obtained phase shifts and optical power information associated with the at least one first and second optical signal.

Action 303

After obtaining the information in Action 302, the network node 110, 111 determines information associated with the optical fiber 131 based on the obtained information. This means that the network node 110, 111 may use the obtained information in Action 302, such as, for example, phase shifts and optical power information associated with the at least one first and second optical signal, in order to determine information associated with the optical fiber 131, i.e. to perform an analysis of the condition of the optical fiber 131.

According to one example, the network node 110, 111 may use the phase shifts and powers, as obtained from the perceived periodic or sinusoidal signal properties of the transmitted rectangular periodic pulse trains and their corresponding responses received via the optical fiber 131, to determine a system response in frequency domain for the optical fiber 131. A system response, which may be defined in the form of a transfer function, may be obtained for the optical fiber 131, since the first and second optical signal will only comprise frequency content at the specific frequency corresponding to the determined period of the optical pulse train forming the second optical signal. Then, by using multiple optical pulse trains of different periods, i.e. transmitting two or more first optical signals defined by having different periods and receiving the second optical signals in response, allows the network node 110, 111 to improve the approximating the transfer function better and better for each optical pulse train that is comprised in the analysis. For example, a time domain impulse response may be derived by transforming the transfer function via an Inverse Fast Fourier Transform, IFFT. The time domain impulse response and/or the transfer function may then be analysed and evaluated by the network node 110, 111 in order to determine information associated with the optical fiber 131, such as, for example, determining the length to a possible event, fault or break-point of the optical fiber 131.

According to another example, the network node 110, 111 may use of the obtained phase shift information in the following manner in order to determine information associated with the optical fiber 131, such as, for example, determining the length to a possible event, fault or break-point of the optical fiber 131. In this example, for the sake of simplicity, it is assumed that only one reflection point at the end of the optical fiber 131 exists. It should also be noted that the intention with this example is to explain and shown how a combined use of multiple optical pulse trains of different periods may be used to provide phase shifts with a timing accuracy that is within a nanosecond range or even lower, e.g. about one or a few ns or less. This timing accuracy corresponds to an accuracy in optical fiber length determination that is within a centimeter range or even lower, e.g. around one or a few centimeters or less.

First, assume that $\Delta t$ is the Round-Trip Time, RTT, in an optical fiber 131 for an optical pulse train of a first optical signal defined by the period T, thus also defined by the frequency $f=1/T$. Here, RTT refers to the travel time of an optical signal from the optical transmitter, or laser diode (LD), of the optical transceiver unit 121, to the reflection point within the optical fiber 131 and back to the receiver photo diode (PD) of the optical transceiver unit 121. This means that if the length to the reflection point of the optical fiber 131 is L, then L may be described by Eq. 1:

$$2L = \Delta t \cdot c0 \quad \text{(Eq. 1)}$$

wherein c0 is the signal speed of the optical signal in the optical fiber 131, which may be assumed to be about $2*10\hat{0}8$ m/s, i.e. about the speed of light. This results in a $\Delta t=10$ μs per kilometer, km, of the optical fiber 131.

Secondly, if $\Delta t<T$, it has been noted that $\Delta t$ and the phase shift of the first and second optical signals, $\Delta \rho$, may be related and described according to Eq. 2:

$$\Delta t = T \cdot \Delta \rho / 2\pi \quad \text{(Eq. 2)}$$

and is thus unambiguous, i.e. exactly measurable. However, if $\Delta t>T$, then $\Delta t$ and the phase shift of the first and second optical signals, $\Delta \rho$, may be related and described according to Eq. 3:

$$\Delta t = K \cdot T + T \cdot \Delta \rho / 2\pi \quad \text{(Eq. 3)}$$

wherein K is an unknown multiple. This is because the phase shift $\Delta \rho$ may only be measured modulo $2\pi$. Although, by having a sufficiently good guess of what $\Delta t$ is, it is possible to determine the unknown multiple K as $K=\lfloor \Delta t/T \rfloor$.

Furthermore, from the equations Eq. 2-3, it may be noted that measurement errors, $\delta \rho$, in the phase shift of the first and second optical signals, $\Delta \rho$, will result in an estimation error, $\delta t$, of $\Delta t$ as described in Eq. 4:

$$\delta t = T \cdot \delta \rho / 2\pi \quad \text{(Eq. 4)}$$

Thus, it may be noted that it is desirable to have a long period T, such that $\Delta t<T$ is fulfilled and Eq. 2 may be used for a direct measurement of $\Delta t$. On the other hand, it is also desirable to have a short period T in order to keep the estimation error, $\delta t$, low according to Eq. 4. According to one example, a solution is to use optical pulse trains of a number of first optical signals, each defined by different periods or frequencies, in order to refined the estimation of $\Delta t$ iteratively.

For example, starting with a first optical signal comprising an optical pulse train defined by having a long period $T_1$, i.e. a very low frequency $f_1$, provides a rough estimate of $\Delta t$ according to Eq. 2 while ensuring that $\Delta t<T$ is fulfilled. Then, using another first optical signal comprising an optical pulse train defined by having a period $T_2$ that is shorter than $T_1$, i.e. a frequency $f_2$ that is higher than the frequency $f_1$, will result in the ambiguity described by Eq. 4. However, this ambiguity may be resolved by using the rough estimate of $\Delta t$ obtained from the previous first optical signal. Hence, subsequently decreasing the period T of the optical pulse trains of subsequent first optical signals, i.e. increasing the frequency, further refinements in the estimation of $\Delta t$ is achieved as the estimation error, $\delta t$, goes down according to Eq. 4.

It thus follows that with a measurement error, $\delta \rho$, in the phase shift of the first and second optical signals, $\Delta \rho$, of 10% and a first optical signal comprising an optical pulse train defined by having frequency of $f=100$ MHz, the estimation error, $\delta t$, of $\Delta t$ may be assumed to be about 1 ns. This corresponds to spatial accuracy of about 20 cm.

Furthermore, by using a first optical signal comprising an optical pulse train defined by having frequency of $f=1$ GHz, the estimation error, $\delta t$, of $\Delta t$ may be assumed to be about 100 ps. Theoretically, this means that by using an 1 Gbps optical transceiver, the optical transceiver unit 121 may be capable of providing periodic optical pulse trains with a frequency of 500 MHz. Furthermore, using a 10 Gbps optical transceiver, the optical transceiver unit 121 may be capable of providing periodic optical pulse trains with a frequency of 5 GHz. This advantageously provides improved information about optical fiber infrastructure than current operation status indicators of conventional and standard optical transceiver units.

From the above, it may be seen that according to some embodiments, the network node 110, 111 may determine the information associated with the optical fiber 131 by using information obtained from previously received second optical signals as input when determining the information associated with the optical fiber 131 based on information obtained from subsequently received second optical signals. Also, in some embodiments, the determined information associated with the optical fiber 131 is at least one length of the optical fiber 131. This means, for example, the network node 110, 111 may determine the length to a fault, error or break-point in the optical fiber cable 131 with a very high accuracy.

Figure 4:
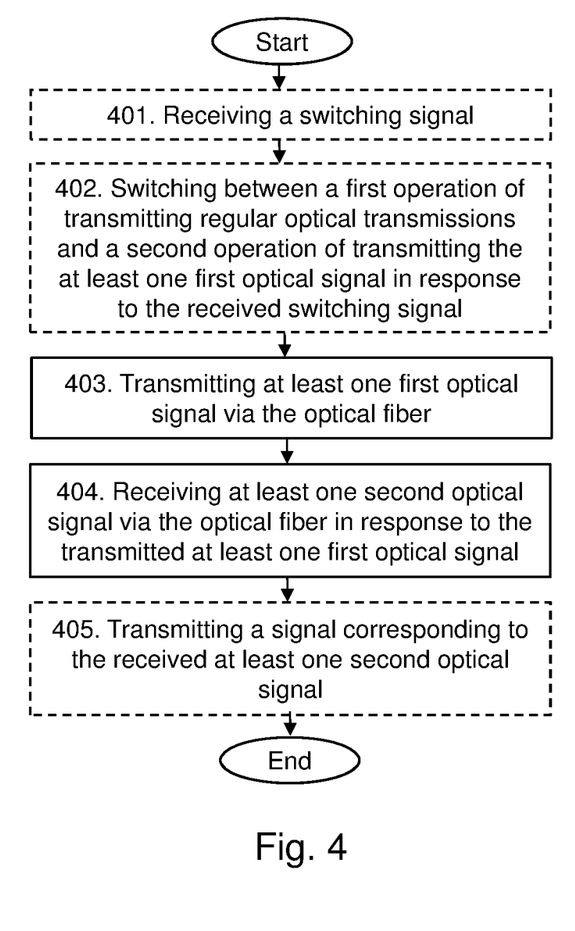
FIG. 4 is a flowchart depicting embodiments of a method performed by an optical transceiver unit.

Example of embodiments of a method performed by an optical transceiver unit 121 for enabling a determination of information associated with an optical fiber 131 in a communications network 100, said optical transceiver unit 121 being configured to be connected to the optical fiber 131, will now be described with reference to the flowchart depicted in FIG. 4. FIG. 4 illustrates an example of actions or operations which may be taken by the optical transceiver unit 121. The method may comprise the following actions.

Action 401

Optionally, in some embodiments, the optical transceiver unit 121 may first receive a signal indicating that the optical transceiver unit 121 is to switch between a first operation of transmitting regular optical transmissions and a second operation of transmitting the at least one first optical signal. This means, for example, that the optical transceiver unit 121 may, e.g. via a microcontroller, receive a switching signal instructing it to switch the optical transceiver unit 121 from a normal operational mode into a testing mode, or vice versa. This is shown and exemplified in more detail in reference to FIGS. 11-12 below.

Action 402

In response to receiving the signal in Action 401, the optical transceiver unit 121 may, according to some embodiments, switch between a first operation of transmitting regular optical transmissions and a second operation of transmitting the at least one first optical signal in response to the received signal. This means, for example, that the optical transceiver unit 121 may, e.g. via the microcontroller, transmit a switching signal instructing a switching unit in the optical transceiver unit 121 to switch the optical transceiver unit 121 from a normal operational mode into a testing mode, or vice versa. This is also shown and exemplified in more detail in reference to FIGS. 11-12 below.

Action 403

In this action, the optical transceiver unit 121 transmits the at least one first optical signal via the optical fiber 131, wherein the at least one first optical signal is an optical pulse train defined by a determined period. This means that the optical transceiver unit 121 may, for example, receive an electronic signal from the network node 110, 111 that corresponds to the first optical signal. The optical transceiver unit 121 may then convert the electronic signal into an optical signal and transmit this as a first optical signal out onto the optical fiber 131. Optionally, the optical transceiver unit 121 may receive information from the network node 110, 111 which causes the optical transceiver unit 121 to transmit an optical signal corresponding to the first optical signal, e.g. via a microcontroller. Hence, in some embodiments, the optical transceiver unit 121 may receive a signal causing the optical transceiver unit 121 to transmit the at least one first optical signal.

In some embodiments, the least one first optical signal comprise two or more first optical signals, and wherein the period of a periodic pulse train of one of the least one first optical signal is different than the period of a periodic pulse train of another one of the least one first optical signal. In some embodiments, the determined period defining an optical pulse train of a subsequently transmitted first optical signal is shorter than the periods defining the optical pulse trains of any previously transmitted first optical signals. Optionally, in some embodiments, the determined period defining an optical pulse train of a subsequently transmitted first optical signal is longer than the periods defining the optical pulse trains of any previously transmitted first optical signals. As previously described above in Action 302, by using several different periods for the optical pulse trains of two or more first optical signals, it is possible quantify the response of the optical fiber 131 at different frequencies. Also, by gradually increasing or decreasing the periods defining the transmitted optical pulse trains of the first optical signals as described above, the number of transmissions of the first optical signals may be stopped whenever a suitable accuracy has been reached for the determined information.

Action 404

After transmitting the at least one first optical signal in Action 403, the optical transceiver unit 121 receives at least one second optical signal received via the optical fiber 131 in response to the transmitted at least one first optical signal. By being able to receive the response of the optical fiber 131 to the transmitted at least one first optical signal, the optical transceiver unit 121 enables the response of the optical fiber 131 to the transmitted periodic optical pulse train of the at least one first optical signal to be collected for analysis and evaluation, e.g. in the network node 110, 111.

Action 405

After receiving the at least one second optical signal in Action 404, the optical transceiver unit 121 may transmit a signal corresponding to the at least one second optical signal to a network node 110, 111 in the communications network 100. This means that the transceiver unit 121 may, for example, transmit or forward an electronic signal corresponding to the received at least one second optical signal directly to the network node 110, 111. In other words, the reflected optical response signal generated in the optical fiber 131 in response to the transmitted at least one first optical signal, i.e. the at least one second optical signal, may be directly transmitted or forwarded to the network node 110, 111 by the optical transceiver unit 121. Here, the signal corresponding to the at least one second optical signal may be the at least one second optical signal itself. In this case, while amplification of the at least one second optical signal may be performed by the optical transceiver unit 121, no actual processing of the at least one second optical signal is normally performed by the optical transceiver unit 121. Optionally, in some embodiments, the optical transceiver unit 121 may transmit information relating to the reflected optical response signal generated in the optical fiber 131 in response to the transmitted first optical signal, i.e. the at least one second optical signal, to the network node 110, 111. In this case, the received optical power of the at least one second optical signal may, for example, be measured and transmitted by the optical transceiver unit 121 to the network node 110, 111. This may, for example, be performed by a power averaging measurement in the optical transceiver unit 121, but it should be noted that no signal analysis on symbols on an optical pulse level is or needs to be performed by the optical transceiver unit 121.

Figure 5:
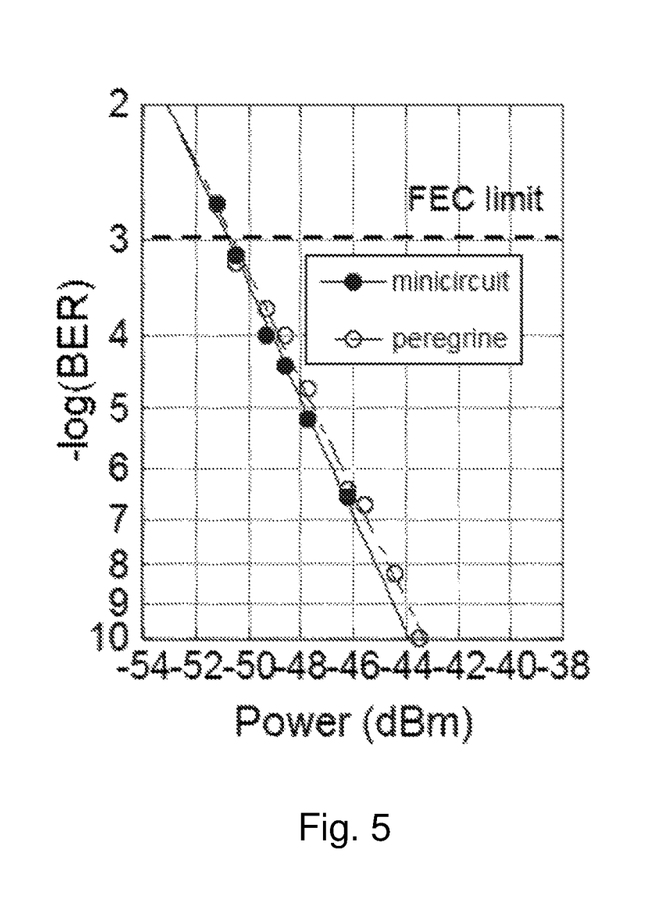
FIG. 5 is a graph illustrating the relationship between Bit-Error Rate, BER, and receiving optical power in an example of an optical transceiver arrangement.

FIG. 5 is a graph illustrating an example of a relationship between a Bit-Error Rate, BER, and received optical power from an optical fiber 131 in an optical transceiver arrangement. In other words, the graph in FIG. 5 illustrates how the BER may be used as an indicator of the received optical power in an optical transceiver unit 121. One advantage of using the BER, which also may be referred to as Symbol Error Rate or SER, is that, although approximative, it allows determining extremely low received optical power levels and therefore extremely low received optical signal amplitudes. This is because the measurement of optical signals at low power or amplitude levels is noisy.

While the optical transceiver unit 121 may be able to measure the received optical power, the network node 110, 111 may not be able to. Instead, the network node 110, 111 may measure the BER/SER of the at least one second optical signal, since the network node 110, 111 is aware of the characteristics of optical pulse train of the at least one first optical signal, i.e. how many and when there is an on-signal, i.e. a digital one ('1'), and off-signal, i.e. a digital zero ('0') transmitted. Thus, the network node 110, 111 may estimate the received optical signal power of the at least one second optical signal even though it may not measure it directly. At low received optical signal power, BER/SER may even be measured best due to the fact that many errors may provide good statistics.

Figure 6:
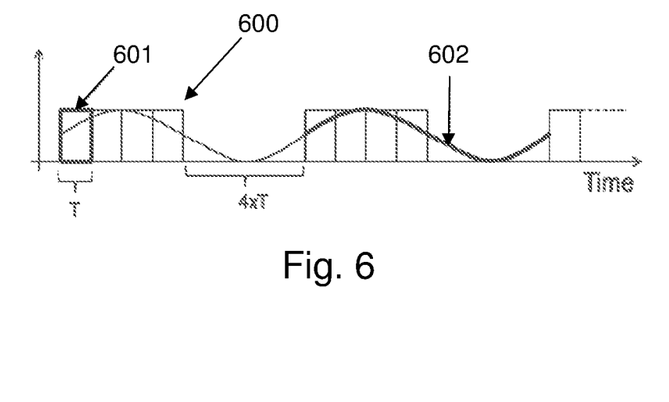
FIG. 6 illustrates an optical pulse train defined by a determined period.

FIG. 6 illustrates an example of a first optical signal comprising an optical pulse train defined by a determined period according to the embodiments described herein. In other words, it describes how an optical pulse train may be defined by a determined period. FIG. 6 further illustrates how an optical pulse train may be defined by a longer period which may be generated from an optical pulse source designed to only generate optical pulses with short duration. It also shows how such an optical pulse train may reflect and be interpreted as a sinusoidal signal with a determined frequency, wherein the determined frequency corresponds to the fundamental frequency of the optical pulse train.

As shown in FIG. 6, the optical pulse train may be formed by a series of individual optical pulse groups 600 separated in time. Each individual optical pulse group 600 may comprise a number of individual optical pulses 601. Each of the individual optical pulses 601 may have a determined optical pulse length, T. This also means that the total time, $T_{group}$, of each individual optical pulse group 600 is formed by the accumulated optical pulse lengths, T, of the individual optical pulses 601 in each of the individual optical pulse groups 600, i.e. $T_{group}=4\times T$ in FIG. 6.

Furthermore, by generating a series of individual optical pulse groups 600 wherein the total time, $T_{group}$, of each individual optical pulse group 600 directly or substantially corresponds to the time separation between the individual optical pulse groups 600 in the series, the optical pulse train formed thereby be seen as and interpreted as a sinusoidal signal 602 with a fundamental frequency, e.g. $f=1/(2\times T_{group})$ This means that the period defining the optical pulse train corresponds to the length and timing of the individual optical pulse groups 600 in the optical pulse train.

Figure 7:
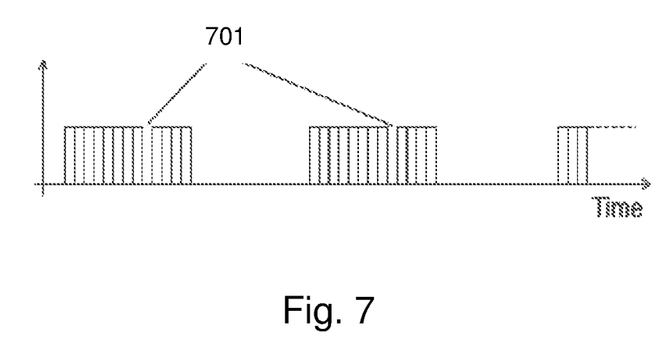
FIG. 7 illustrates optical pulse gaps in an optical pulse train defined by a determined period.

FIG. 7 illustrates an example of how individual optical pulse groups 600 may comprise optical pulse gaps 701 according to the embodiments described herein.

The individual optical pulses 601 in the individual optical pulse groups 600 may be directly subsequent to each other in time. Here, each of the individual optical pulses 601 may be generated, for example, by an On-Off-Keying modulation in an optical transceiver unit. This means, for example, that the individual optical pulses 601 may be modulated as consecutive on-signals or digital ones ('1') in the optical transceiver unit. In this case, the time separation between the individual optical pulse groups 600 may be modulated as consecutive off-signals or digital zeros ('0') in the optical transceiver unit.

However, directly subsequent individual optical pulses 601 in the individual optical pulse groups 600 may, for example, negatively affect the operation of a laser diode and circuits in an optical transceiver unit. This is because the optical pulse train as described herein violate the typically used line code, such as, e.g. 8B/10B line code, used in regular optical data transmission to ensure as many '0/1' optical signal changes as possible in the transmission. Therefore, according to some embodiments herein, optical pulse gaps, or transmission gaps, may be intentionally inserted in and among the individual optical pulses 601 in the individual optical pulse groups 600 in order to relax the load on the laser diode and the electrical circuits in the optical transceiver unit 121. Due to the presence of optical pulse gaps 701, the individual optical pulses 601 in the individual optical pulse groups 600 may also be referred to as substantially subsequent to each other in time. The insertion of the optical pulse gaps 701 in each of the individual optical pulse groups 600 may be performed such that it does not affect the fundamental frequency of the optical pulse train. In particular, the optical pulse gaps 701 may be inserted, for example, in order to fulfil or approximate a DC-free signal requirements of some parts, such as, e.g. capacitors, in the electrical circuits in the optical transceiver unit 121. This may also prevent optical carrier depletion within the lasing medium. This may be performed since the laser diodes and circuits in the optical transceiver unit 121 may only be designed for short optical pulse creation in accordance with its normal operation.

It should also be noted that the network node 110, 111 and the optical transceiver unit 121 described by the embodiments herein advantageously provides an optical fiber test system or qualification system that may run automatically without requiring the assistance of a technician or operator. Also, the testing procedure, as described by the method actions above, may advantageously be initiated and evaluated externally to the optical transceiver unit 121. This allows for a lower complexity in the optical transceiver unit 121 relative to optical transceiver units with built-in OTDR capabilities.

Another advantage is that the network node 110, 111 and the optical transceiver unit 121 described by the embodiments herein may provide improved and more accurate information about the optical fiber 131 in comparison to standard status indicators of conventional optical fiber test systems; this is particularly true for short optical fibers due to the lack of launch lead fiber section.

Figure 8:
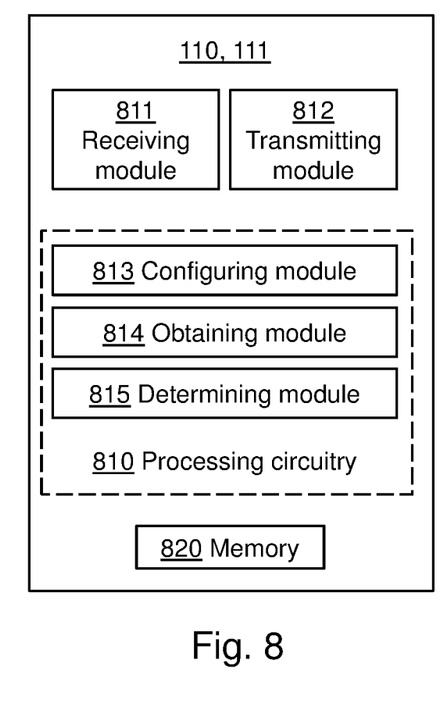
FIG. 8 is a schematic block diagram depicting embodiments of a network node.

To perform the method actions for determining information associated with an optical fiber 131 in a communications network 100, the network node 110, 111 may comprise the following arrangement depicted in FIG. 8. FIG. 8 shows a schematic block diagram of embodiments of the network node 110, 111. The embodiments of the network node 110, 111 described herein may be considered as independent embodiments or may be considered in any combination with each other to describe non-limiting examples of the example embodiments described herein.

The network node 110, 111 may comprise a processing circuitry 810 and a memory 820. The network node 110, 111 may also comprise a receiving module 811 and a transmitting module 812. The receiving module 811 and the transmitting module 812 may be configured to communicate with an optical transceiver unit 121. The receiving module 811 and the transmitting module 812 may also be co-located, such as, in a single transceiver, and may also be said to form part of the processing circuitry 810. In some embodiments, some or all of the functionality described above as being performed by the network node 110, 111 may be provided by the processing circuitry 810 executing instructions stored on a computer-readable medium, such as, e.g. the memory 820 shown in FIG. 8. Alternative embodiments of the network node 110, 111 may comprise additional components, such as, a configuring module 813, a obtaining module 814 and a determining module 815, responsible for providing its functionality necessary to support the embodiments described herein.

The network node 110, 111 or processing circuitry 810 is configured to, or may comprise the configuring module 813 being configured to, configure the optical transceiver unit 121 to transmit at least one first optical signal via the optical fiber 131, wherein the at least one first optical signal is an optical pulse train defined by a determined period. Also, the network node 110, 111 or processing circuitry 810 is configured to, or may comprise the obtaining module 814 being configured to, obtain information associated with at least one second optical signal received by the optical transceiver unit 121 via the optical fiber 131 in response to the transmitted at least one first optical signal. Further, the network node 110, 111 or processing circuitry 810 is configured to, or may comprise the determining module 815 being configured to, determine information associated with the optical fiber 131 based on the obtained information.

In some embodiments, the network node 110, 111 or processing circuitry 810 may be configured to, or may comprise the transmitting module 812 configured to, transmit a signal causing the optical transceiver unit 121 to transmit the at least one first optical signal. In some embodiments, the network node 110, 111 or processing circuitry 810 may be configured to, or may comprise the determining module 815 configured to, determine the information associated with the optical fiber 131 by using information obtained from previously received optical signals as input when determining the information associated with the optical fiber 131 based on information obtained from subsequently transmitted optical signals.

In some embodiments, the network node 110, 111 or processing circuitry 810 may be configured to, or may comprise the transmitting module 812 configured to, transmit control information causing the optical transceiver unit 121 to switch between a first operation of transmitting regular optical transmissions via the optical fiber 131 and a second operation of transmitting the at least one first optical signal via the optical fiber 131.

Furthermore, the embodiments of the network node 110, 111 for determining information associated with an optical fiber 131 in a communications network 100 described above may be implemented through one or more processors, such as, the processing circuitry 810 in the network node 110, 111 depicted in FIG. 8, together with computer program code for performing the functions and actions of the embodiments herein. The program code mentioned above may also be provided as a computer program product, for instance in the form of a data carrier, such as, e.g. an electronic signal, optical signal, radio signal, or computer-readable storage medium, carrying computer program code or code means for performing the embodiments herein when being loaded into the processing circuitry 810 in the network node 110, 111. The computer program code may e.g. be provided as pure program code in the network node 110, 111 or on a server and downloaded to the network node 110, 111. Those skilled in the art will also appreciate that the processing circuitry 810 and the memory 820 described above may refer to a combination of analog and digital circuits, and/or one or more processors configured with software and/or firmware, e.g. stored in a memory, that when executed by the one or more processors such as the processing circuitry 820 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

It should be noted that the modules of the network node 110, 111 may in some embodiments be implemented as computer programs stored in memories, e.g. in the memory module 820 in FIG. 8, for execution by processors, e.g. the processing module 810 of FIG. 8.

To perform the method actions for enabling a determination of information associated with an optical fiber 131 in a communications network 100, the optical transceiver unit 121 may comprise any of the following arrangements depicted in FIG. 9-12. The optical transceiver unit 121 is configured to be connected to the optical fiber 131 FIGS. 9-12 shows schematic block diagrams of embodiments of the optical transceiver unit 121. The embodiments of the optical transceiver unit 121 described herein may be implemented in a Small Form factor Pluggable, SFP, optical transceiver or similar small-scale optical transceiver.

The optical transceiver unit 121 is configured to transmit at least one first optical signal via the optical fiber 131, wherein the at least one first optical signal is an optical pulse train defined by a determined period, and receive at least one second optical signal via the optical fiber 131 in response to the transmitted at least one first optical signal. In some embodiments, the optical transceiver unit 121 may be configured to receive a signal causing the optical transceiver unit 121 to transmit the at least one first optical signal. In some embodiments, the optical transceiver unit 121 may be configured to receive a signal indicating that the optical transceiver unit 121 is to switch between a first operation of transmitting regular optical transmissions and a second operation of transmitting the at least one first optical signal, and switch between a first operation of transmitting regular optical transmissions and a second operation of transmitting the at least one first optical signal in response to the received signal. In some embodiments, the optical transceiver unit 121 may be configured to transmit a signal corresponding to the at least one second optical signal to a network node 110, 111 in the communications network 100.

Furthermore, embodiments of the optical transceiver unit 121 described herein may comprise a laser driver configured to receive an electrical transmitting signal, or Tx-signal, and to control a laser diode, LD, to output an optical transmission signal corresponding to the received electrical input signal. The embodiments of the optical transceiver unit 121 described herein may also comprise a p-controller, which also may be referred to as a micro-controller micro-processing circuit, configured to receive control signals or information in order to control the Laser Driver and at least one post-amplifier. The at least one post-amplifier is configured to receive an electric output signal from at least one photo diode, PD, corresponding to an optical transmission signal received by the at least one photo diode, PD. The at least one post-amplifier is configured to output an electrical receiving signal, or Rx-signal, from the optical transceiver unit 121, e.g. to a network node 110, 111 in the communications network 100.

Figure 9:
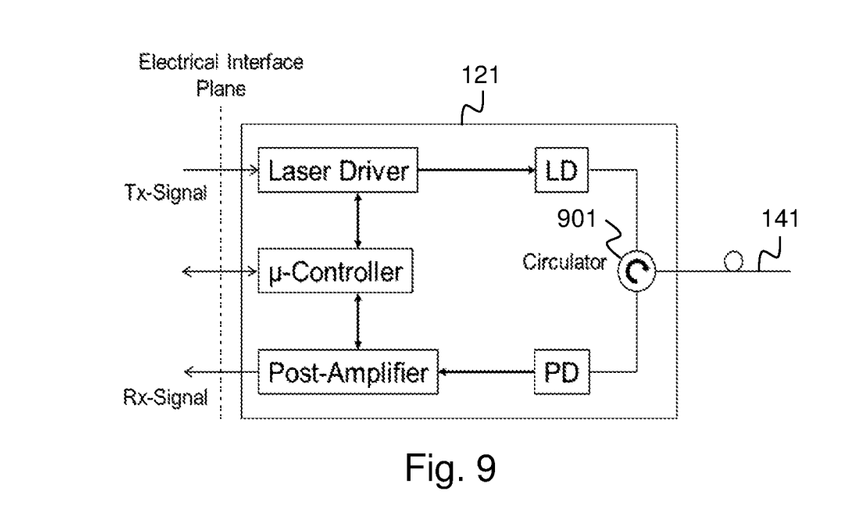
FIG. 9 is a schematic block diagram depicting embodiments of an optical transceiver unit.

As shown by the embodiment in FIG. 9, the optical transceiver unit 121 may be configured for bi-directional optical data transmission over a single optical fiber 131 via a circulator 901. The circulator 901, or optical circulator element, is connected to both the laser diode, LD, and the photo diode, PD. The circulator 901 is configured to receive optical transmission signals from the laser diode, LD, and transmit the received optical transmission signals out onto the optical fiber 131. The circulator 901 is also configured to receive optical transmission signals from the optical fiber 131 and forward the received optical transmission signals onto the photo diode, PD.

Figure 10:
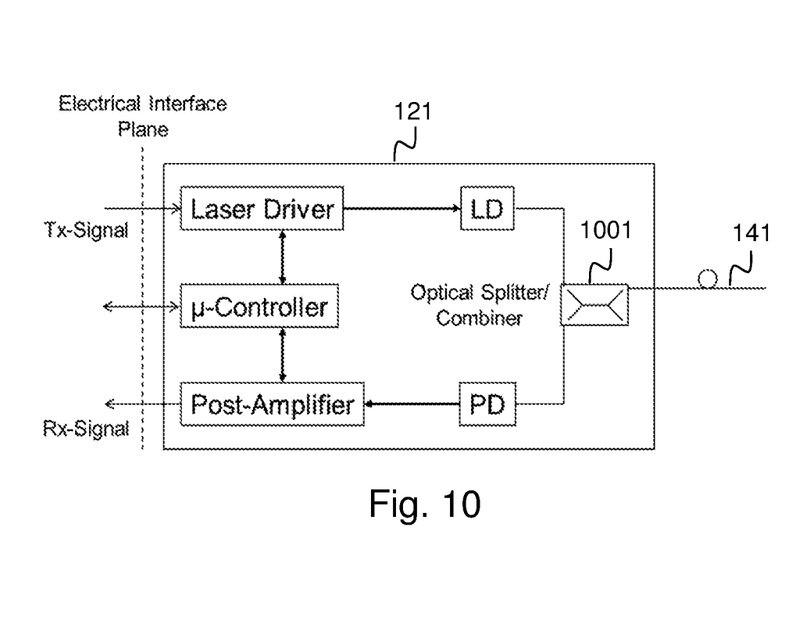
FIG. 10 is another schematic block diagram depicting embodiments of an optical transceiver unit.

Optionally, as shown by the embodiment in FIG. 10, the optical transceiver unit 121 may be configured for bi-directional optical data transmission over a single optical fiber 131 via an optical splitter 1001. The optical power splitter 1001, which also may be referred to as an optical power splitter element, optical combiner or optical power combiner element, is here also connected to both the laser diode, LD, and the photo diode, PD. The optical power splitter 1001 is configured to receive optical transmission signals from the laser diode, LD, and transmit the received optical transmission signals out into the optical fiber 131. The optical power splitter 1001 is also configured to receive optical transmission signals from the optical fiber 131 and forward the received optical transmission signals onto the photo diode, PD.

Figure 11:
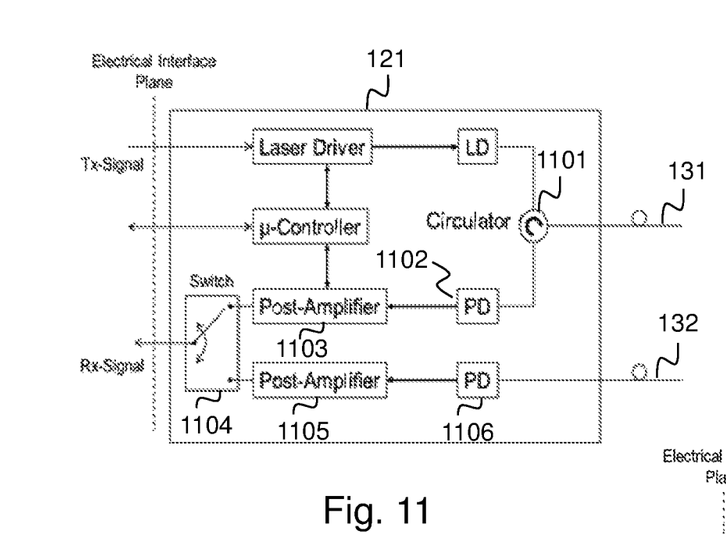
FIG. 11 is a further schematic block diagram depicting embodiments of an optical transceiver unit.
Figure 12:
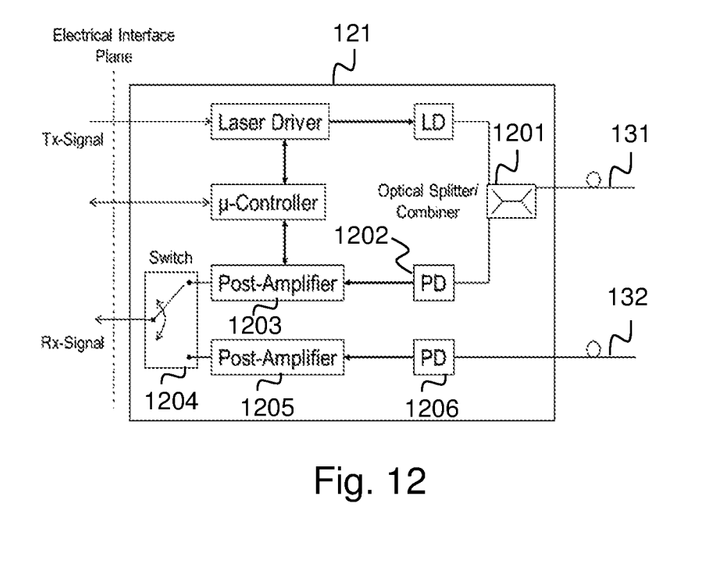
FIG. 12 is yet a further schematic block diagram depicting embodiments of an optical transceiver unit.

As shown the embodiments in FIGS. 11-12, the optical transceiver unit 121 may also be configured for optical data transmission over two, uni-directional optical fibers, e.g. a first and a second optical fiber 131, 132. In this case, the optical transceiver unit 121 may comprise either a circulator 1101, or an optical splitter 1201, connected to the laser diode, LD, and to a first photo diode, PD, 1102, 1202. The circulator 1101, or optical splitter 1201, is here configured to receive optical transmission signals from the laser diode, LD, and transmit the received optical transmission signals out into the first optical fiber 131. Further, the circulator 1101, or optical splitter 1201, is configured to receive optical transmission signals from the first optical fiber 131 and forward the received optical transmission signals onto the first photo diode, PD, 1102, 1202. In this case, the first photo diode, PD, 1102, 1202 may be configured to convert the received optical transmission signal into an electric output signal and transmit the electrical output signal to a first post-amplifier 1103, 1203. The first post-amplifier 1103, 1203 is configured to output an electrical receiving signal, or Rx-signal, to a switch 1104, 1204 in the optical transceiver unit 121.

The switch 1104, 1204 may be configured to switch between receiving the electrical receiving signal, or Rx-signal, from the first post-amplifier 1102, 1202, or from an electrical receiving signal, or Rx-signal, from a second post-amplifier 1105, 1205. The second post-amplifier 1105, 1205 may be configured to receive an electric output signal from a second photo diode, PD, 1106, 1206, corresponding to an optical transmission signal received by the second photo diode, PD, 1106, 1206, via the second optical fiber 132. The switch 1104, 1204 may be configured to output one of the electrical receiving signal, or Rx-signals, from the optical transceiver unit 121, e.g. to a network node 110, 111 in the communications network 100. The switch 1104, 1204 may, for example, be controlled by the p-controller in response to control information or signal received by the p-controller in the optical transceiver unit 121.

It should be noted that, here, the second post-amplifier 1105, 1205, the second photo diode, PD, 1106, 1206, and the second optical fiber 132 may be used by the optical transceiver unit 121 for receiving optical data transmissions during regular optical transmission operations. In this case, the laser driver and the laser diode, LD, may be used for transmitting optical data transmissions during regular optical transmission operations.

The terminology used in the detailed description of the particular embodiments illustrated in the accompanying drawings is not intended to be limiting of the described network node 110, 111, optical transceiver unit 121 and methods therein which instead should be construed in view of the enclosed claims. As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method in a network node for determining information associated with an optical fiber in a communications network, said optical fiber being connected to an optical transceiver unit, the method comprising
configuring the optical transceiver unit to transmit at least one first optical signal via the optical fiber, wherein the at least one first optical signal is an optical pulse train comprised of a series of individual pulse groups having a time separation between the individual pulse groups and in which a number of pulses, each having a pulse length T, comprise each individual pulse group, and wherein the individual pulse groups and the time separation between the individual pulse groups provide for a sinusoidal signal of a determined period;
obtaining information associated with at least one second optical signal received by the optical transceiver unit via the optical fiber in response to the transmitted at least one first optical signal; and
determining information associated with the optical fiber based on the obtained information.

2. The method according to claim 1, wherein the configuring further comprises transmitting a signal causing the optical transceiver unit to transmit the at least one first optical signal.

3. The method according to claim 1, wherein the obtained information comprise one or more of information indicating a phase-shift between the at least one first optical signal and the at least one second optical signal, information indicating a power of the at least one second optical signal, and information indicating a Bit Error Rate (BER) value associated with the at least one second optical signal.

4. The method according to claim 1, wherein the at least one first optical signal comprises two or more first optical signals, and wherein a period defining an optical pulse train of one of the two or more first optical signals is different than a period defining an optical pulse train of another one of the two or more first optical signals.

5. The method according to claim 1, wherein the determining further comprises determining the information associated with the optical fiber by using information obtained from previously received second optical signals as input when determining the information associated with the optical fiber based on information obtained from subsequently received second optical signals.

6. The method according to claim 1, wherein the determined information associated with the optical fiber is at least one length of the optical fiber.

7. The method according to claim 1, wherein the configuring further comprises transmitting control information causing the optical transceiver unit to switch between a first operation of transmitting regular optical transmissions via the optical fiber and a second operation of transmitting the at least one first optical signal via the optical fiber.

8. A network node for determining information associated with an optical fiber in a communications network, said optical fiber being connected to an optical transceiver unit, the network node configured to perform operations comprising:
configure the optical transceiver unit to transmit at least one first optical signal via the optical fiber, wherein the at least one first optical signal is an optical pulse train comprised of a series of individual pulse groups having a time separation between the individual pulse groups and in which a number of pulses, each having a pulse length T, comprise each individual pulse group, and wherein the individual pulse groups and the time separation between the individual pulse groups provide for a sinusoidal signal of a determined period;

obtain information associated with at least one second optical signal received by the optical transceiver unit via the optical fiber in response to the transmitted at least one first optical signal; and determine information associated with the optical fiber based on the obtained information.

9. The network node according to claim 8, further configured to transmit a signal causing the optical transceiver unit to transmit the at least one first optical signal.

10. The network node according to claim 8, further configured to determine the information associated with the optical fiber by using information obtained from previously received optical signals as input when determining the information associated with the optical fiber based on information obtained from subsequently transmitted optical signals.

11. The network node according to claim 8, further configured to transmit control information causing the optical transceiver unit to switch between a first operation of transmitting regular optical transmissions via the optical fiber and a second operation of transmitting the at least one first optical signal via the optical fiber.

12. A method performed by an optical transceiver unit for enabling a determination of information associated with an optical fiber in a communications network, said optical transceiver unit connected to the optical fiber, the method comprising transmitting at least one first optical signal via the optical fiber, wherein the at least one first optical signal is an optical pulse train comprised of a series of individual pulse groups having a time separation between the individual pulse groups and in which a number of pulses, each having a pulse length T, comprise each individual pulse group, and wherein the individual pulse groups and the time separation between the individual pulse groups provide for a sinusoidal signal of a determined period; and receiving at least one second optical signal received via the optical fiber in response to the transmitted at least one first optical signal.

13. The method according to claim 12, further comprising receiving a signal causing the optical transceiver unit to transmit the at least one first optical signal.

14. The method according to claim 12, wherein the least one first optical signal comprises two or more first optical signals, and wherein the period of a periodic pulse train of one of the least one first optical signal is different than the period of a periodic pulse train of another one of the least one first optical signal.

15. The method according to claim 12, further comprising:

receiving a signal indicating that the optical transceiver unit is to switch between a first operation of transmitting regular optical transmissions and a second operation of transmitting the at least one first optical signal, and switching between a first operation of transmitting regular optical transmissions and a second operation of transmitting the at least one first optical signal in response to the received signal.

16. The method according to claim 12, further comprising:

transmitting a signal corresponding to the at least one second optical signal to a network node in the communications network.

17. An optical transceiver unit for enabling a determination of information associated with an optical fiber in a communications network, said optical transceiver unit connected to the optical fiber, the optical transceiver unit configured to perform operations comprising:

transmit at least one first optical signal via the optical fiber, wherein the at least one first optical signal is an optical pulse train comprised of a series of individual pulse groups having a time separation between the individual pulse groups and in which a number of pulses, each having a pulse length T, comprise each individual pulse group, and wherein the individual pulse groups and the time separation between the individual pulse groups provide for a sinusoidal signal of a determined period; and receive at least one second optical signal via the optical fiber in response to the transmitted at least one first optical signal.

18. The optical transceiver unit according to claim 17, further configured to receive a signal causing the optical transceiver unit to transmit the at least one first optical signal.

19. The optical transceiver unit according to claim 17, further configured to receive a signal indicating that the optical transceiver unit is to switch between a first operation of transmitting regular optical transmissions and a second operation of transmitting the at least one first optical signal, and switch between a first operation of transmitting regular optical transmissions and a second operation of transmitting the at least one first optical signal in response to the received signal.

20. The optical transceiver unit according to claim 17, further configured to transmit a signal corresponding to the at least one second optical signal to a network node in the communications network.

* * * * *